United States Patent
Whittle et al.

(10) Patent No.: US 7,072,964 B1
(45) Date of Patent: Jul. 4, 2006

(54) SYSTEM AND METHOD FOR INTERCONNECTING MULTIPLE VIRTUAL PRIVATE NETWORKS

(75) Inventors: Bryan Whittle, Skillman, NJ (US); Kaj Tesink, Fair Haven, NJ (US)

(73) Assignee: Science Applications International Corporation, San Diego, CA (US)

( * ) Notice: Subject to any disclaimer, the term of this patent is extended or adjusted under 35 U.S.C. 154(b) by 860 days.

(21) Appl. No.: 09/653,201

(22) Filed: Aug. 31, 2000

Related U.S. Application Data

(60) Provisional application No. 60/151,563, filed on Aug. 31, 1999.

(51) Int. Cl.
*G06F 13/00* (2006.01)

(52) U.S. Cl. .................................................. 709/226
(58) Field of Classification Search ................ 709/200, 709/201, 203, 217, 218, 219, 220, 223, 224, 709/225, 226, 227; 713/200, 201
See application file for complete search history.

(56) References Cited

U.S. PATENT DOCUMENTS

| | | | |
|---|---|---|---|
| 6,079,020 A * | 6/2000 | Liu .............................. 713/201 |
| 6,097,722 A * | 8/2000 | Graham et al. ......... 370/395.21 |
| 6,104,701 A | 8/2000 | Avargues et al. |
| 6,141,409 A * | 10/2000 | Madoch et al. ......... 379/207.02 |
| 6,148,337 A * | 11/2000 | Estberg et al. ............... 709/224 |
| 6,173,399 B1 * | 1/2001 | Gilbrech ...................... 713/153 |
| 6,175,917 B1 * | 1/2001 | Arrow et al. .................... 713/1 |
| 6,226,748 B1 * | 5/2001 | Bots et al. ................... 713/201 |
| 6,226,751 B1 * | 5/2001 | Arrow et al. ................ 713/201 |
| 6,609,153 B1 * | 8/2003 | Salkewicz .................... 709/223 |
| 6,694,437 B1 * | 2/2004 | Pao et al. .................... 713/201 |
| 6,701,437 B1 * | 3/2004 | Hoke et al. ................. 713/201 |
| 6,751,729 B1 * | 6/2004 | Giniger et al. .............. 713/153 |
| 6,788,681 B1 * | 9/2004 | Hurren et al. ............... 370/389 |
| 6,937,574 B1 * | 8/2005 | Delaney et al. ............. 370/254 |

OTHER PUBLICATIONS

ANX IPsec Certificate Profile, "Appendix A, Certificate Profile for ANZX IPsec Certificates," date unknown but prior to filing date of U.S. Appl. No. 60.151,563, pp. 1-2, Version 1.0, 50215886.070700.

"ANX 101: Basic ANX Service Outline," date unknown but prior filing date of U.S. Appl. No. 60/151,563, 476 pages, v.2, 50215886.070700.

(Continued)

*Primary Examiner*—Moustafa M. Meky
(74) *Attorney, Agent, or Firm*—Banner & Witcoff, Ltd.

(57) ABSTRACT

A system and method for interconnecting multiple VPNs, each using multiple service providers, while offering a minimum standard of end-to-end connection quality and reliability is described. The system and method utilizes an overseer that resolves end-to-end issues across multiple interconnected virtual private networks. When connecting multiple virtual private networks, multiple interconnect providers are interconnected so that the end-to-end service quality standard is met. The certification of service providers, exchange points, transit service providers and IPSec devices permits interoperability for encryption, integrity and authentication across the product of all IPSec vendors. When two subscribers both use certified IPSec equipment then they can provide each other with controlled access to each other's networks.

5 Claims, 10 Drawing Sheets

OTHER PUBLICATIONS

"ANX 101: Basic ANX Service Outline," date unknown but prior filing date of U.S. Appl. No. 60/151,563, 274 pages, v. 1.2, 50215886.070700.

"ANX 201: Advanced ANX Service Outline," 1998, 298 pages, v 1, 50215886.070700.

"ANX Release 1 Draft Document Publication," 1997, 10 pages, Automotive Industry Action Group, Southfield, Michigan.

"ANXO Certificate Authority Service and Directory Service Definition for ANX Release 1, including Requirements on ANX CSP/CEPO Certificate Authorities," May 9, 1997, pp. 5-24, Issue 1, Revision 1, AIAG Telecommunications Project Team (TPT) and Bellcore.

"ANXO Certification Process and ANX Registration Process Definition for ANX Release 1," May 30, 1997, pp. 1-37, Issue 1, Revision 4, AIAG Telecommunications Project Team (TPT) and Bellcore.

"Metrics, Criteria, and Measurement Technique Requirements for ANX Release 1," Jun. 16, 1997, pp. 8-107, AIAG Telecommunications Project Team (TPT) and Bellcore.

"ANX® Release 1 Document Publication," 1998, Part 1, pp. 1-28, Part 2, pp. 260, Part 3, pp. 20, Part 4, pp. 20, Part 5, pp. 1-20, Part 6, pp. 17, AIAG TEL-2 02, Automotive Industry Action Group.

"ANX Release 1 Document Corrections," ANX® Overseer TEL-2 02 Corrections, May 11, 1999, pp. 114, Rev. 8a, Auitomotive Industry Action Group (AIAG), Southfield, Michigan, 60152104.083199.

* cited by examiner

SYSTEM AND METHOD FOR INTERCONNECTING MULTIPLE VIRTUAL PRIVATE NETWORKS

This application claims priority to the following provisional patent application, which is incorporated herein by reference in its entirety:

(1) Provisional Application Ser. No. 60/151,563, titled "Method & Apparatus For a Globalized Automotive Network & Exchange," filed on Aug. 31, 1999, and having reference no. 99,532 (479.83581).

BACKGROUND OF THE INVENTION

1. Field of the Invention

The present invention relates to virtual private networks. More particularly, the present invention relates to virtual private networks wherein in each virtual private network, multiple service providers can be utilized by the trading partners of the virtual private network. The end-to-end service quality of the connection within the virtual private network is guaranteed to meet minimum requirements. The end-to-end service quality encompasses numerous factors including: network services; interoperability; performance; reliability; disaster recovery and business continuity; security; customer care; and trouble handling. The system and method of the present invention is directed to the interconnection of multiple virtual private networks each having multiple service providers. Furthermore the present invention encompasses a system and method for interconnecting multiple interconnect providers, such as exchange points, exchange networks, direct connect or transit service providers, between the multiple virtual private networks. Finally, the present invention employs an end-to-end overseer across the multiple virtual private networks.

2. Description of the Related Art

Early in 1994, the automotive industry recognized the need for global network services that would support more new demanding automotive business applications. The purpose of this network service was to simplify complex, redundant, outdated connection methods while minimizing costs and ensuring the management, security, reliability, and performance essential to the automotive industry. Transport Control Protocol/Internet Protocol (TCP/IP) was endorsed as the standard suite for electronic data communications.

Ultimately in 1995, the industry formed a Telecommunications Project Team to oversee the design and development of a common global communication infrastructure supporting automotive industry application initiatives (later called the Automotive Network eXchange (ANX) Implementation Task Force). The Task Force, in June 1997, published the initial results of the technical design process for this new network service, called the Automotive Network eXchange (ANX), in "ANX Release 1 Draft Document Publication" (TEL-2 01.00). This reference is incorporated herein by reference in its entirety. The TEL-2 specification undergoes constant updating and correction.

The ANX system is a business-to-business communications infrastructure that provides a uniform, secured link between trading partners, such as manufacturers and suppliers, in the automotive industry. The ANX is a subscription-based network composed of Certified Service Providers (CSP). CSPs are providers of IP network service that have satisfied certain service end-to-end quality. CASPs are certificate authority service providers. The Certified Exchange Point Operator (CEPO) provides services to interconnect CSPs. CEPOs also must satisfy certain end-to-end service quality requirements.

Trading Partners (TP) are registered end users, or subscribers, of the ANX system such as automotive parts manufacturers, suppliers, original equipment manufacturers, and car manufacturers. The ANX system allows TPs to communicate, exchange information, and transact business with other TPs over the ANX network. The TP may utilize any TCP/IP-compliant application program to exchange information with other TPs. The registered TP selects the TPs with which it wants to communicate and thereafter may gain access to and receive communications from those selected TPs. As a result, the ANX system allows each TP to develop its own virtual private network with its customers and vendors.

The ANX system significantly reduces the complexity of connecting to multiple trading partners. Since there are diverse communication protocols for the trading partners, separate links are required to access each trading partner.

By having a single private network operated under a uniform protocol, interconnectivity between various trading partners is substantially simplified. In addition, ANX offers improved end-to-end service quality. For example, if an auto manufacturer needs to place with its parts supplier an order for car seats, the manufacturer may submit over the ANX system its confidential CAD drawings directly to the supplier. The manufacturer may also fill out the order form that the supplier may have for filling orders and timely submit over the ANX system due to its high reliability and performance.

The CSP and the CEPO must satisfy certain performance and security requirements in order to be certified under the ANX. The certification process is disclosed in ANX Release 1 Document Publication (TEL-2 02.00), which is incorporated herein by reference in its entirety.

The ANX VPN permits the use of a plurality of different IPSec devices. By virtue of the TEL-2 specification and the certification process all of the designated IPSec devices are guaranteed to communicate with one another across the ANX VPN.

While the ANX was originated out of the need to interconnect automotive related companies, it is not limited to that industry. Any company/industry may become a TP, e.g. an aerospace company, a healthcare company, etc. ANX has become known as the Advanced Network eXchange.

With the advent of the Internet, global communication has become a reality. While the Internet works well for non-mission critical applications, such as transmitting and receiving e-mail and hosting websites, it has some drawbacks for business-to-business commerce and communication that require stringent end-to-end service quality. Quality concerns are in the area of end-to-end service quality as explained previously.

For example, when two companies want to communicate over the Internet, the lag between the systems at each company will be different virtually every time. The connection each has through its service provider, i.e. 14.4K, 28.8K, 56K, ISDN, DSL, T1, etc., plus the number of servers through which the connection is directed contribute to the resulting time lag between the two companies. Depending upon the type of information transmitted, the two parties may require a maximum acceptable time lag. Due to the nature of the Internet, it cannot guarantee such a maximum time lag. Furthermore, the two companies may desire that service assistance be available at certain times or 24 hours a day. The Internet has no such guarantees for help availability in a multi-provider environment. Such a lack of guaranteed bandwidth, latency and reliability are major impediments to business-to-business commerce and communication over the Internet.

In recent years the number of electronic viruses and hacker attacks has increased dramatically. A company considering conducting business-to-business commerce over the Internet runs the risk of making their intranet vulnerable to such viruses and attacks with the potential related loss of data.

In order to address the security issue, some companies have developed virtual private networks (VPNs). Secure VPNs permit a company to communicate with any other entity on the network without the risk of increased vulnerability to viruses and hackers. However, while VPNs can connect to other VPNs over the Internet by providing authentication, access control, confidentiality and data integrity, there is still no way the end-to-end quality of the connection can be guaranteed to meet a required set of minimum standards in a multi-provider setting.

A secure VPN is a communication network that is secured with encryption and authentication. Secure VPNs are based on multiple technologies, for example IPSec, tunneling, certification and shared secret authentication. IPSec is the security standard established by the Internet Engineering task Force (IETF). Tunneling permits private networks to cross the Internet using unregistered IP addresses.

SUMMARY OF THE INVENTION

From the foregoing, it is desirable to provide a system and method for interconnecting multiple VPNs each using multiple service providers while offering a minimum standard of end-to-end service quality.

The system and method of the present invention utilizes an overseer that defines the service quality, continually qualifies service providers as meeting that service quality, and resolves end-to-end issues across multiple interconnected virtual private networks, such as the ANX. When connecting multiple virtual private networks according to the system and method of the present invention multiple interconnect providers are interconnected, and the manner in which these interconnect providers are interconnected so that the quality and reliability standards are met is another aspect of the present invention.

Certification of IPSec devices permits interoperability for encryption, integrity and authentication across the product of all IPSec vendors. When two subscriber companies both use certified IPSec equipment then they can provide each other with controlled access to each other's networks.

Based on the foregoing, an object of the present invention is to provide a system and method of interconnecting multiple VPNs each using multiple service providers while offering a minimum standard of end-to-end connection quality and reliability.

Another object of the present invention is to provide a system and method of interconnecting multiple VPNs having an overseer that resolves end-to-end issues across multiple virtual private networks.

Still another object of the present invention is to provide a system and method of connecting multiple virtual private networks in which multiple interconnect providers are interconnected so that the end-to-end service quality is met.

DETAILED DESCRIPTION OF THE DRAWINGS

The foregoing and other attributes of the present invention will be described with respect to the following drawings in which.

Figure 16:
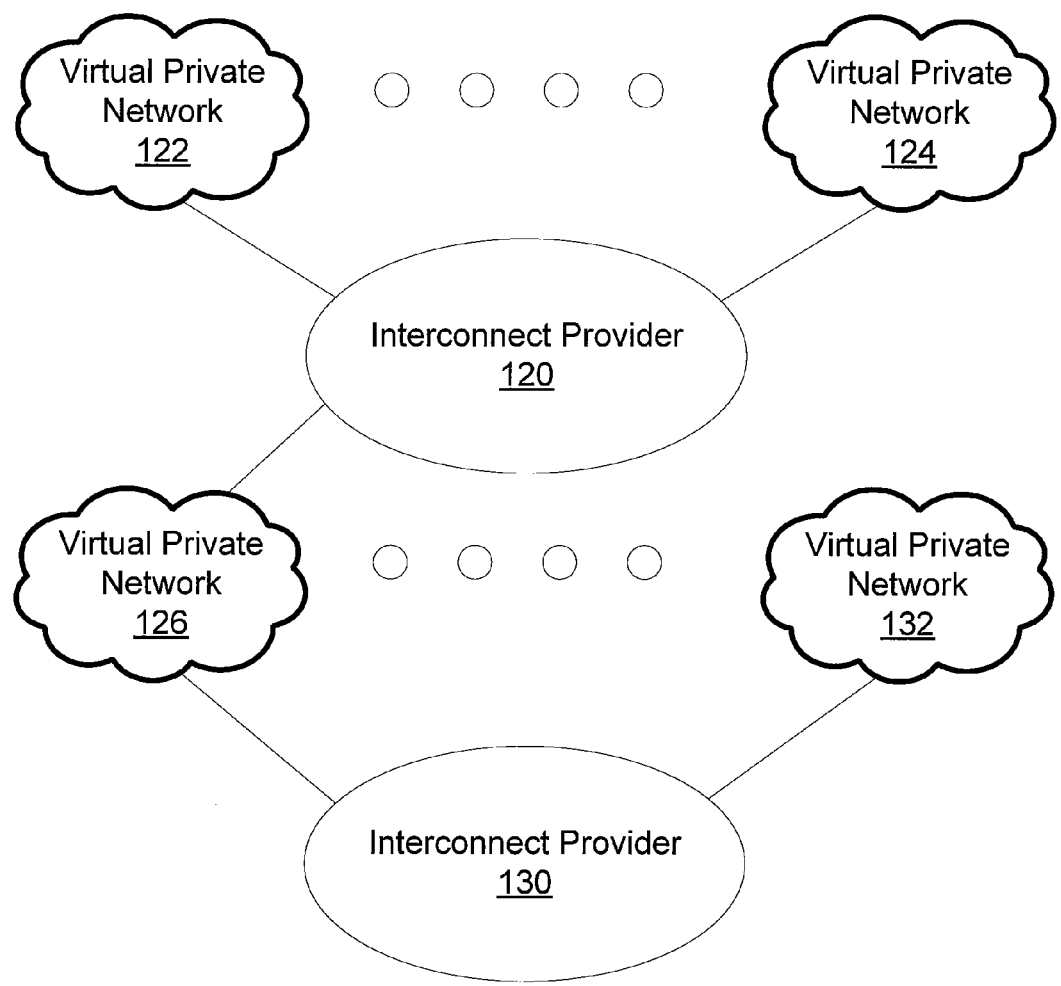
Figure 17A:
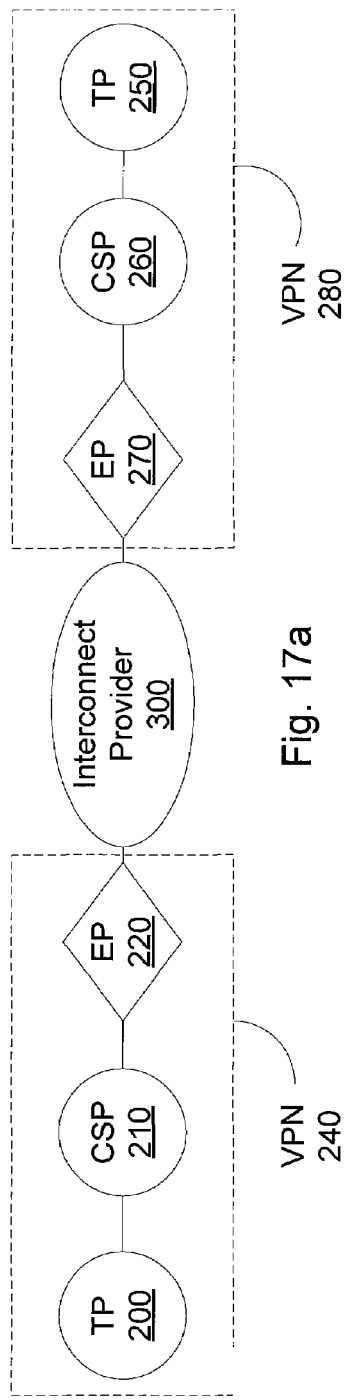
Figure 17B:
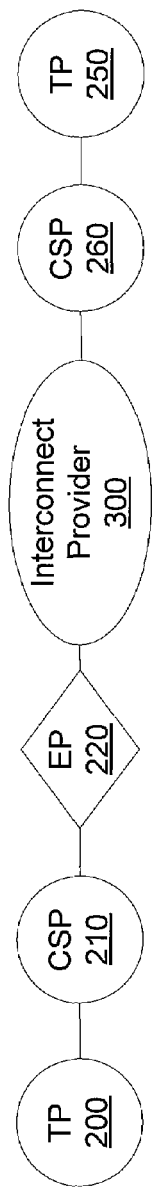
Figure 17C:
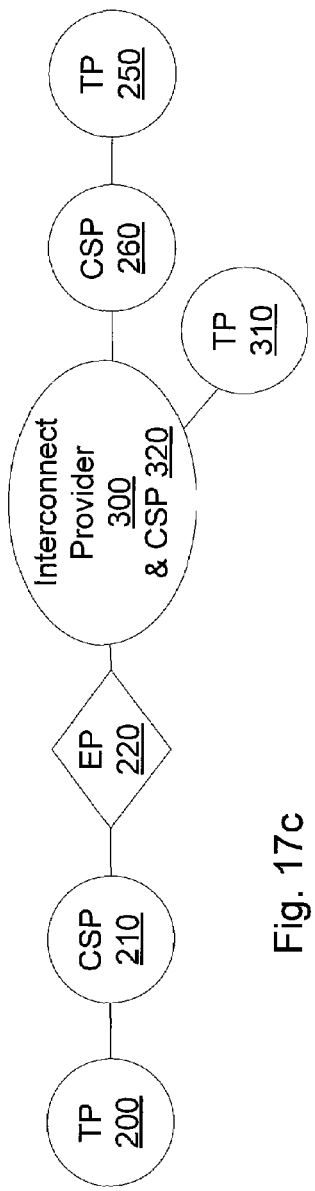

FIG. 16 is a diagram illustrating interconnection of multiple virtual private networks using a multiple transit certified service providers, where no single transit certified service provider connects all of the virtual private networks according to the present invention; and FIGS. 17a–c are alternative configurations for interconnecting multiple virtual private networks according to the present invention.

DETAILED DESCRIPTION OF THE PREFERRED EMBODIMENTS

Figure 1:
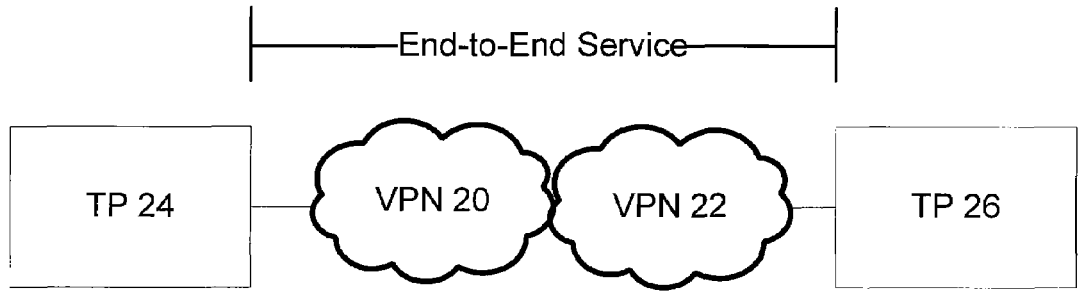
FIG. 1 is a block diagram of two interconnected virtual private networks according to the present invention.

FIG. 1 shows a block diagram of two interconnected virtual private networks (VPN) 20 and 22. The present system and method of the interconnecting multiple virtual private networks is not intended to be limited to only these types of networks and has applicability to a wide variety of virtual private networks.

Each virtual private network 20 and 22 is shown having a trading partner (TP) 24 and 26, respectively. While FIG. 1 shows only one TP 24 and 26 for each virtual private network, there can in fact be hundreds or thousands of such TPs for each virtual private network. FIG. 1 is intended to define the end-to-end service quality concept, and for such a purpose, only one TP 24 and 26 is needed for each virtual private network 20 and 22.

The end-to-end service quality, provided by the present system and method of interconnecting multiple virtual private networks, cannot be achieved by simply interconnecting two virtual private networks, such as 20 and 22, with a wire. The end-to-end service quality incorporates a user-centric philosophy, where the user is the TP or subscriber. The user is guaranteed a minimum level of service encompassing factors that include: network services; interoperability; performance; reliability; disaster recovery and business continuity; security; customer care; and trouble handling. Simply connecting the two virtual private networks 20 and 22 with a wire will not achieve the minimum satisfactory levels for these factors.

Figure 2:
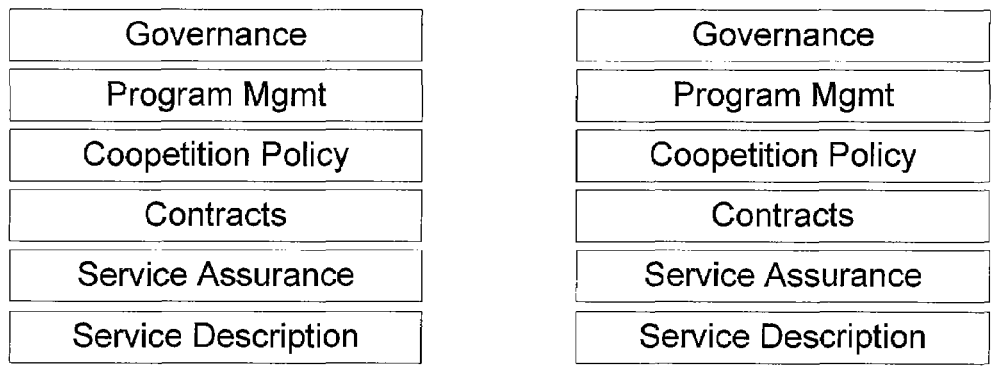
FIG. 2 is a configuration of governance and management of separate virtual private networks.

To achieve such minimum levels of satisfactory performance for these factors the system and method must include a way to resolve disputes between the two virtual private networks. Referring to FIG. 2, each VPN 20 and 22 is shown as having its own governance, program management, coopetition policy, contracts, service assurance, and service description. While each virtual private network can operate with a successful level of end-to-end service quality when each VPN is not interconnected to another VPN, the governance, program management, coopetition policy, contracts, service assurance, and service description may need to be revised when interconnecting two or more VPNs in order to maintain the end-to-end service quality. It will be appreciated that at the very least the interconnection of at least two VPNs adds at least one additional level of complexity with regard to service between the VPNs.

Figure 3:
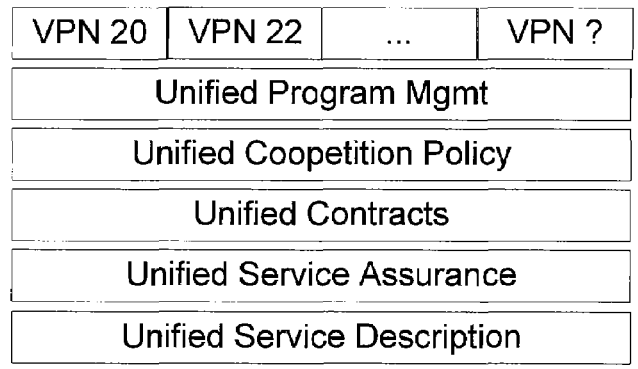
FIG. 3 is a configuration of governance and management of interconnected virtual private networks according to the present invention.

One resolution is shown in FIG. 3, in which each VPN 20 and 22 maintain their own governance, but the program management, coopetition policy, contracts, service assurance, and service description for the two VPNs 20 and 22 are unified. Such unification means that where the parameters for the program management, coopetition policy, contracts, service assurance, and service description of the two VPNs 20 and 22 are different, the parameter used in one of the networks is chosen as the acceptable minimum standard or a compromise parameter different from the parameter used in each of the VPNs is agreed upon. It is possible that the parameters for communication within each VPN need not change, while the new parameters are used only when communicating between VPNs. FIG. 3 further shows that the system and method contemplate connecting more than two VPNs.

Figure 4:
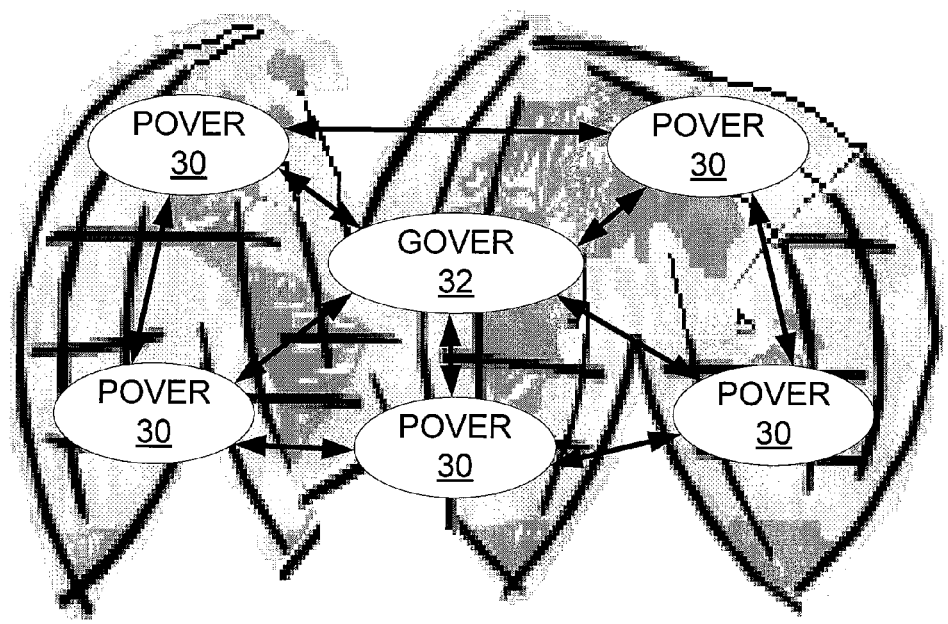
FIG. 4 is an interconnection configuration for governance of multiple interconnected virtual private networks according to the present invention.

One configuration for governance of multiple interconnected VPNs is shown in FIG. 4. In this scenario each VPN has its own program overseer (POVER) 30, and a global, or multiple virtual private network, overseer (GOVER) 32 is provided to resolve issues between the POVERs 30. Arrows are shown between the POVERs 30 indicating that the POVERs 30 are free to resolve their issues without requiring the GOVER 32. The GOVER is called on when direct POVER-to-POVER resolution fails. Each of the POVERs 30 governs one of the regional VPNs, while the GOVER 32 oversees the interconnection of the VPNs.

The GOVER is responsible for end-to-end quality assurance, and in particular acts as an inter-VPN interconnection certifier. The GOVER certifies interconnection facilities, and certifies a global CASP—CASP trust model. The GOVER also is an inter-VPN arbitrator that steps in when POVERs cannot resolve trouble between them.

Since the VPNs are used to running their networks in isolation, the interconnection of multiple VPNs has unique issues such as resolving trouble and conflicts between the VPNs and maintenance of minimum end-to-end service quality across the multiple programs. Since the system and method of the present invention are directed to providing specific end-to-end service quality, it must be possible for TPs to quantify the end-to-end service quality levels, and these service quality levels must be sufficient to allow applications to work across the multiple VPNs. Therefore, a high level of metric compatibility and measurement techniques are required.

In the ANX type VPN each TP, CSP and CEP must meet specified criteria to become certified and to maintain that certification. The certification provides the TPs or subscribers with confidence that the level of transport and security will meet their business needs. The ANX type VPN utilizes multiple CSPs. On one level it is easier to run a VPN where all TPs are required to use a single CSP. The use of multiple CSPs in the ANX type VPN fosters competition between the CSPs and allows the VPN to reach TPs that may not be serviced by a single CSP. The implementation of multiple CSPs, however, brings with it the drawback of insuring that the CSPs can talk to one another. Whether the connection from one TP to another TP within the same VPN is through a single CSP of two CSPs should be invisible to the TPs. The TPs need never know when one or more CSPs are used for any particular connection. The certification process ensures that the TPs use one of the certified IPSec devices at their premises, and that the CSPs will utilize certified equipment and meet certain metrics so as to achieve the end-to-end service quality guaranteed to the TPs. In this manner, the multiple CSPs will be able to communicate with one another. The CSPs must meet business criteria, technical metrics, ongoing monitoring, trouble-handling criteria, routing registry criteria, and domain name registry criteria to achieve and maintain certification.

Figure 5:
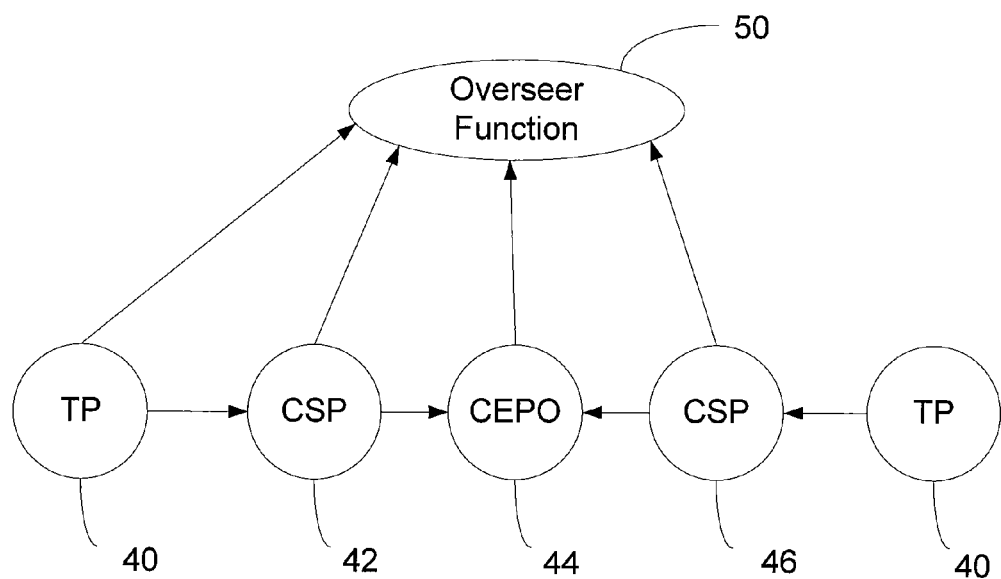
FIG. 5 is a flow chart showing contractual obligations according to the present invention.

FIG. 5 shows the contractual obligations of the members of an ANX-type VPN. The TPs 40 contract with the VPN, as denoted in FIG. 5 by the arrows to the overseer 50, and contract with one of the multiple CSPs 42. The CSPs contract with the VPN and with the CEPO 44. The CEPO 44 contracts with the VPN. Each entity is responsible for the services that that entity provides.

Figure 6:
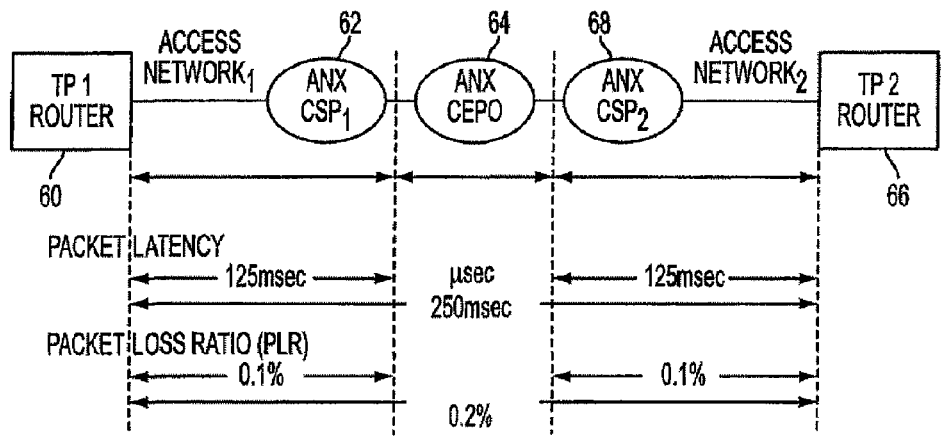
FIG. 6 is a diagram illustrating end-to-end latency in a virtual private network having multiple service providers.

The technical metrics for achieving end-to-end service quality in the ANX-type network include among other metrics, latency and availability. FIG. 6 illustrates the end-to-end latency within the ANX network. The TP1 router 60 is connected to ANX $CSP_1$ 62, which in turn is connected to ANX CEPO 64. TP2 router 66 is connected to ANX $CSP_2$ 68, which is connected to ANX CEPO 64. The packet latency from each router 60 and 66 through the corresponding CSP is 125 msec. The latency through the ANX CEPO is on the order of microseconds. The total packet latency through the network is therefore only slightly more than 250 msec.

Figure 7:
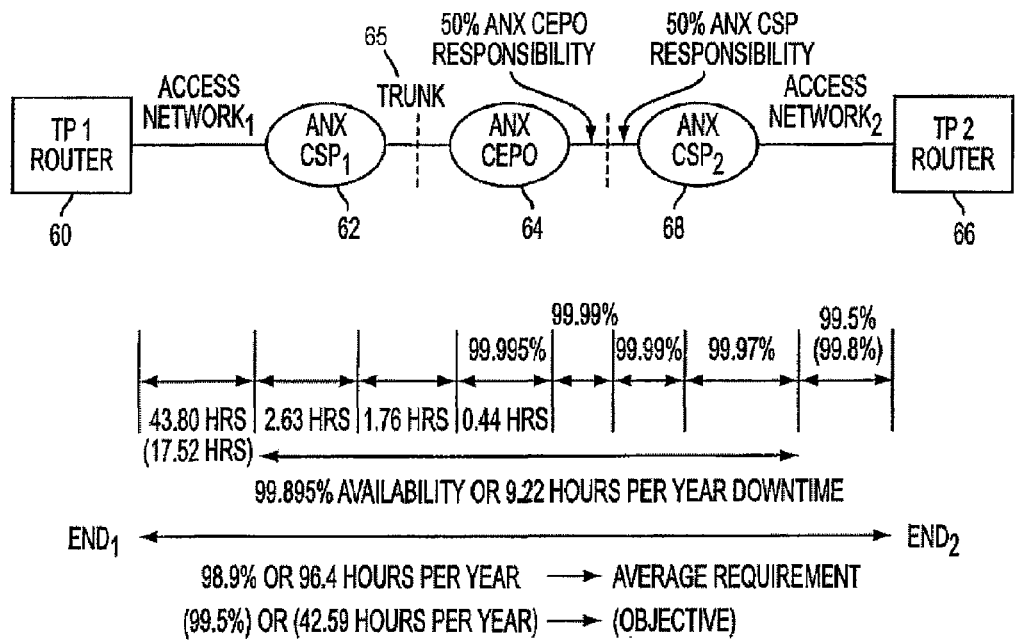
FIG. 7 is a diagram illustrating end-to-end availability in a virtual private network having multiple service providers.

FIG. 7 illustrates the end-to-end availability metric. The Access network, between the TP1 router 60 and the ANX $CSP_1$ 62 is permitted to be unavailable 43.80 hours/year. The ANX $CSP_1$ 62 may only be unavailable 2.63 hrs./year. The trunk 65 between the ANX $CSP_1$ 62 and the ANX CEPO 64 may only be unavailable 1.76 hrs./year. The ANX CEPO 64 may only be unavailable 0.44 hours/year. The foregoing availabilities yield a total of 99.895% availability or 9.22 hours per year downtime.

Figure 8:
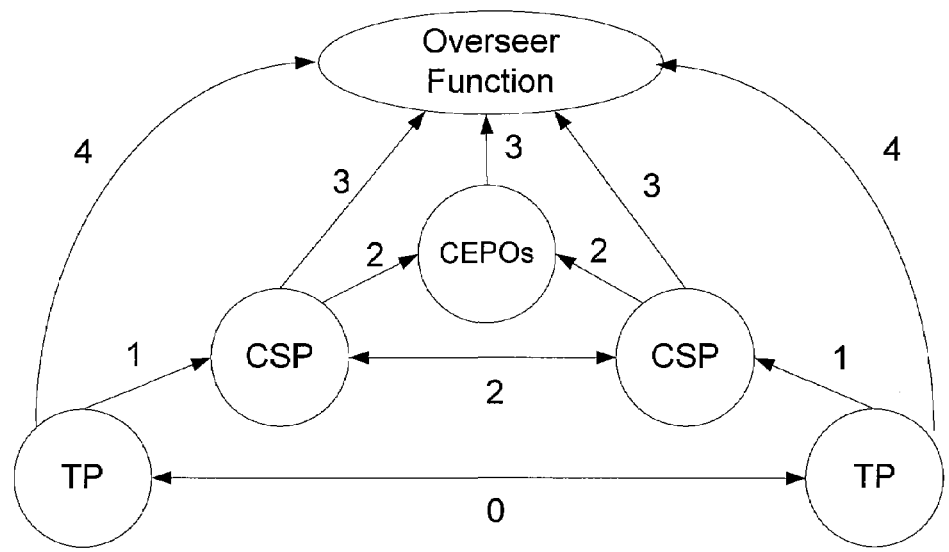
FIG. 8 is a diagram illustrating trouble handling in a virtual private network having multiple service providers.

The outline for how trouble is handled within the ANX-type VPN is shown in FIG. 8. There are effectively five layers of trouble handling. At the first level trouble between TPs is handled directly between the two TPs. Similarly, issues between the TPs and the CSPs are handled between the two parties. CSPs and the CEPOs also resolve their troubles between the troubled parties. A network overseer is provided to handle troubles that cannot be handled in the foregoing scenarios. The overseer can take complaints from the TPs, the CSPs, and the CEPOs.

A key to providing predictable end-to-end service quality is that the TPs must know the level of service they receive. To this end four service provider accountability levels exist. First, service providers, both interconnect providers and CSPs, must timely fix infrequent service provider troubles. Second, there must be end-to-end service provider cooperation to handle any troubles. Third, recourse must be provided to resolve disputes in the event of disagreement between CSPs and/or interconnect providers. Fourth, recourse must be provided to resolve continued non-compliance with the end-to-end service quality.

Figure 9:
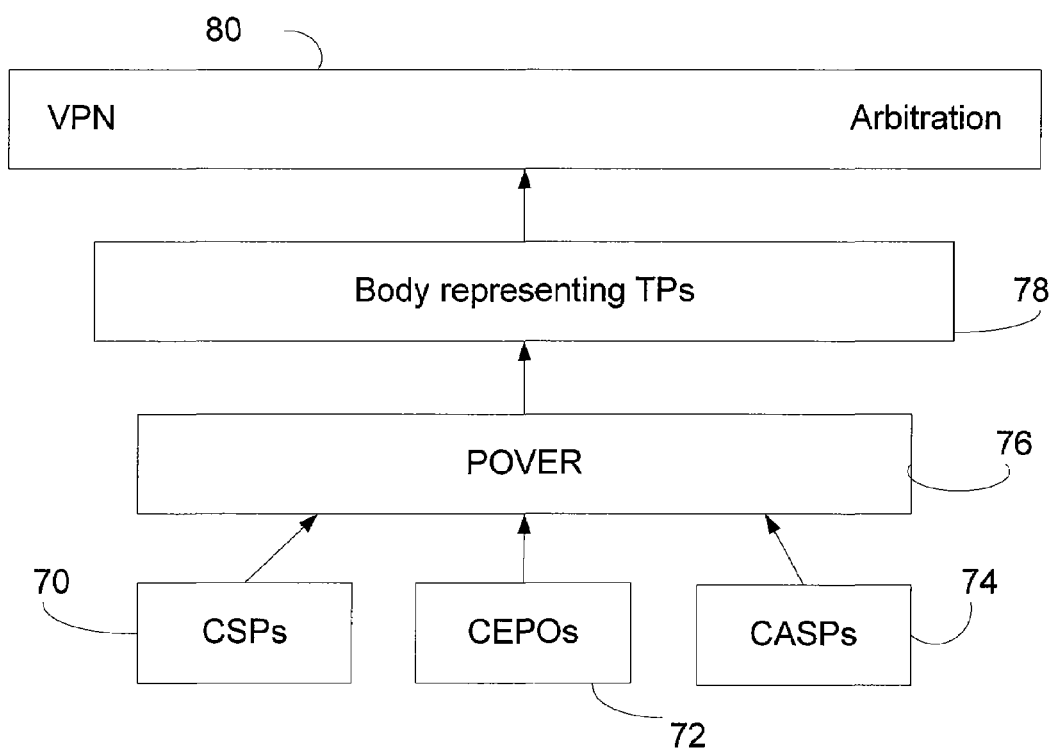
FIG. 9 is a diagram illustrating an accountability model for a single virtual private network having multiple service providers.
Figure 10:
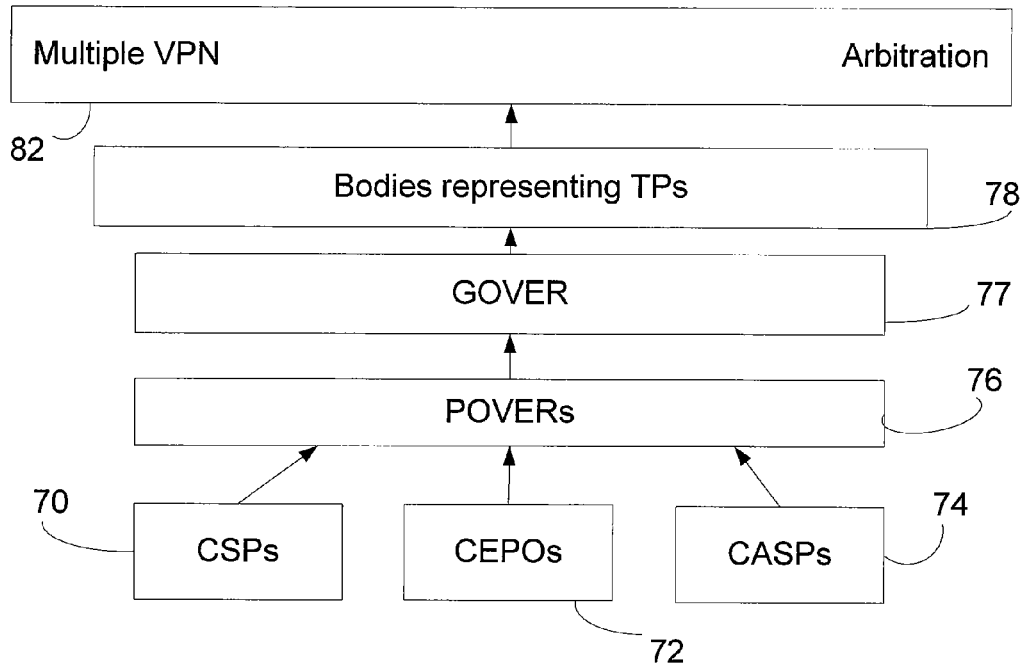
FIG. 10 is a diagram illustrating an accountability model for multiple virtual private networks having multiple service providers according to the present invention.

Referring to FIGS. 9 and 10, charts for single VPN and interconnected VPNs are shown, respectively. In FIG. 9, the CSPs 70, CEPOs 72 and CASPs 74 are accountable to the POVER 76. The POVER 76 is accountable to the body 78 representing the TPs. The body 78 is accountable a regional/national arbitration body 80. Where multiple VPNs are interconnected in FIG. 10, the CSPs 70, the CEPOs 72, and CASPs 74 are accountable to the POVERs 76. The POVERs 76 are accountable to a GOVER 77, which in turn is accountable to the body 78. The body 78, instead of being accountable to the regional/national arbitration body 80, is accountable to an international arbitration body 82.

The GOVER/POVER model is but one way to oversee ensuring of the end-to-end service quality and metric compatibility. How the ANX-type networks are connected will be discussed below. In this context there must be five key types of end-to-end technology compatibility: 1 network interconnection that ensures a trading partner on one VPN can reach any trading partner on the other VPN; 2 routing compatibility that ensures any trading partner on one VPN can logically reach any TP on the other VPN; 3 naming compatibility, e.g. so the web names or e-mail names of any trading partner on one VPN can be resolved to an address that is routable over the two VPNs; 4 IPSec compatibility; and 5 digital security certificate compatibility across multiple VPNs. While FIGS. 9 and 10 refer to regional/national VPNs and international arbitration, the VPNs need not be limited to a specific country or geographical area. Any ANX-type VPN, regardless of the location of its subscribers could be interconnected.

Figure 11:
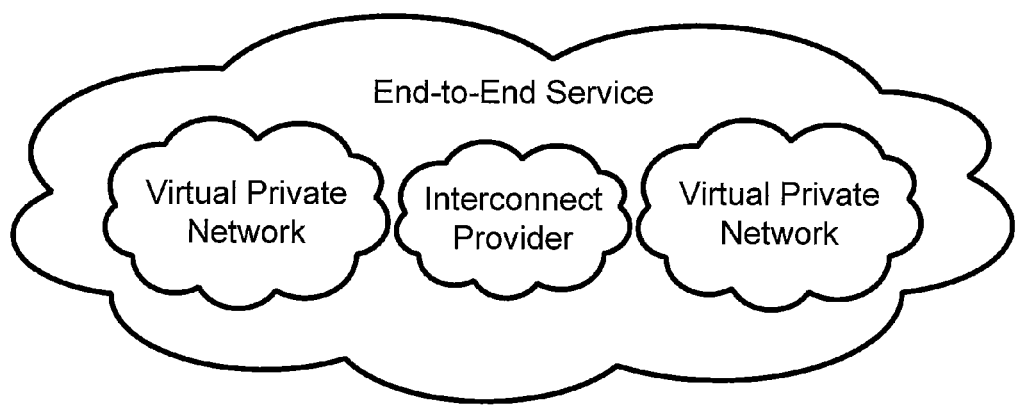
FIG. 11 is a diagram illustrating end-to-end interconnection of two virtual private networks according to the present invention.

While FIG. 1 illustrated the interconnection of two VPNs 20 and 22, a significant element is missing. FIG. 11 shows two VPNs, that have multiple service providers, which are connected through an inter-program service provider, also called an interconnect provider. The Tel-2 specification is still used as the basic guide in determining the end-to-end service quality, however regional or particular VPN peculiarities, referred to as deltas, must be considered when establishing the interconnected end-to-end service quality standards.

Figure 12:
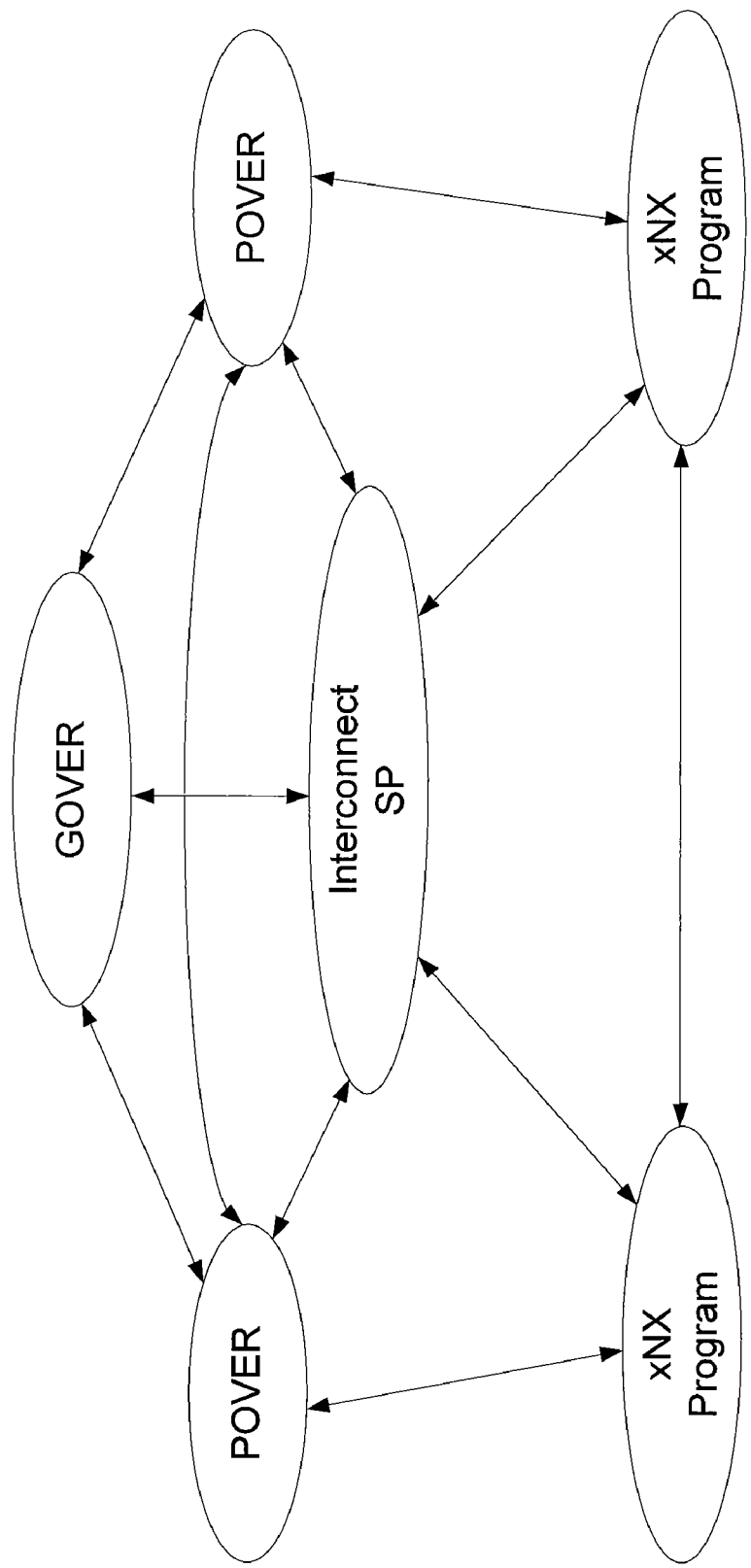
FIG. 12 is a diagram illustrating a trouble escalation model for interconnection of two virtual private networks according to the present invention.

Returning to the GOVER/POVER model for overseeing interconnected VPNs; FIG. 12 illustrates an end-to-end trouble escalation model. It is expected that CSPs will work together to resolve trouble before contacting a POVER. Similarly, the POVERs and/or the POVERs and the interconnect provider are expected to work together to resolve trouble before contacting the GOVER.

Figure 13:
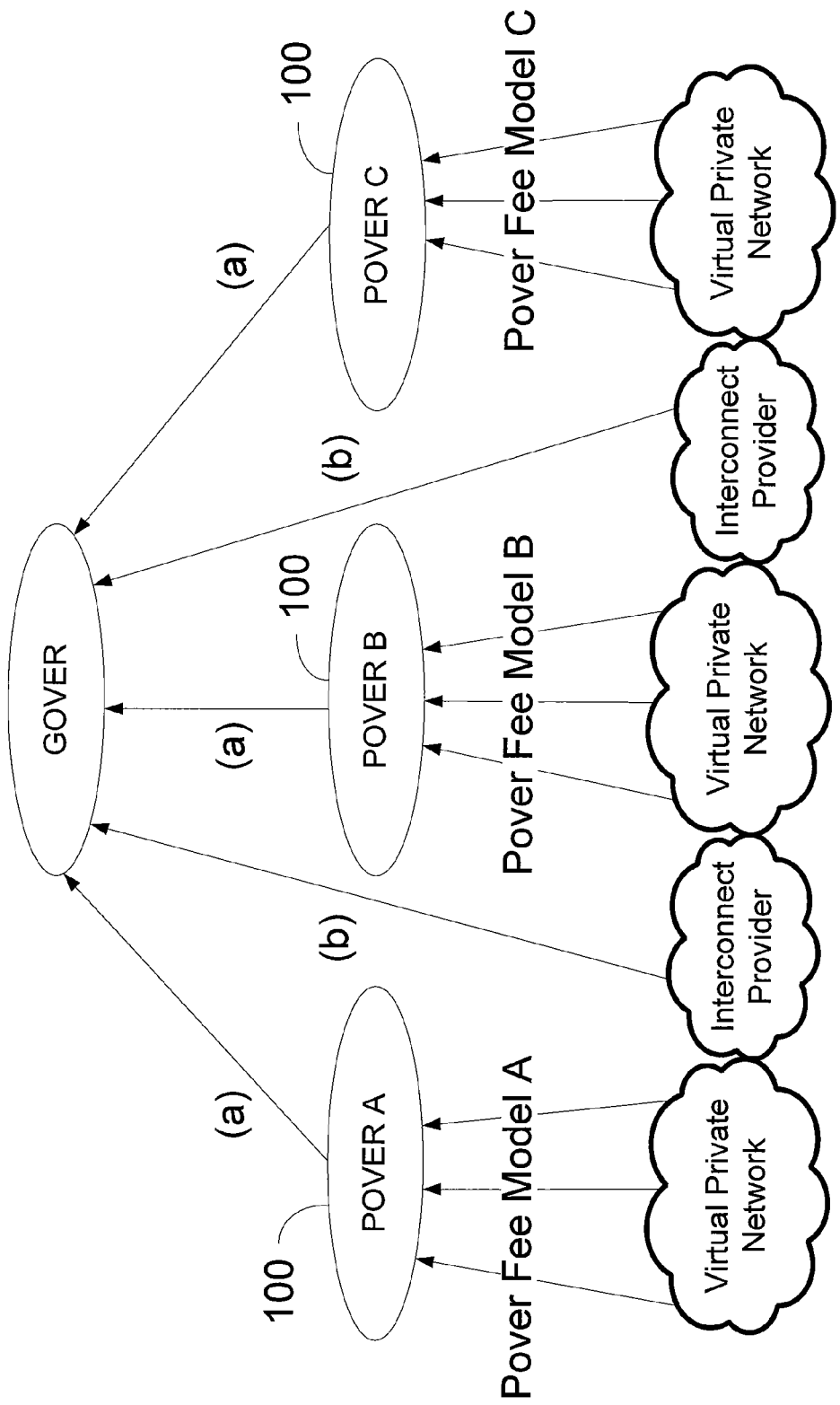
FIG. 13 is a diagram illustrating a multiple virtual private network fee model for interconnection of two virtual private networks according to the present invention.

When expanding from a single VPN to interconnected VPNs the inherent costs of running the system naturally increase. How such costs are distributed is an important part of the system. As shown in FIG. 13, the POVERs 100 pay fees to the GOVER to offset the costs of maintaining the GOVER. The VPNs having multiple service providers in turn pay fees to support the POVER. Furthermore interconnect providers pay a certification fee to the GOVER for certification as a interconnect provider between VPNs.

Figure 14:
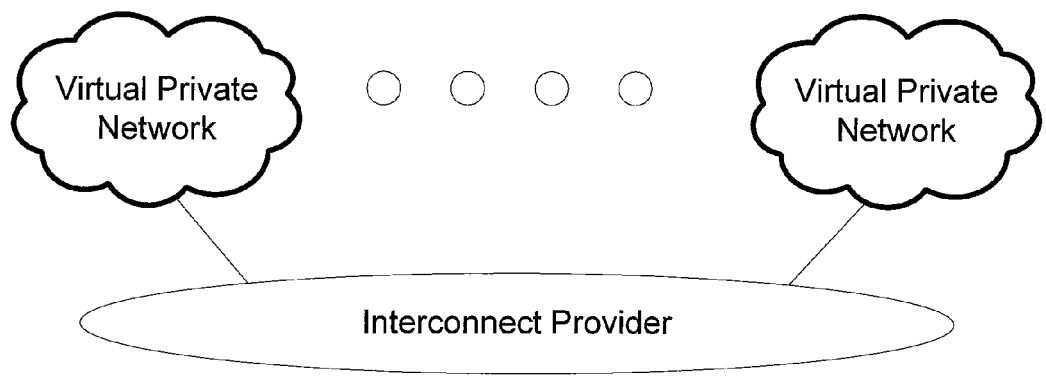
FIG. 14 is a diagram illustrating interconnection of two virtual private networks using a single transit certified service provider according to the present invention.
Figure 15:
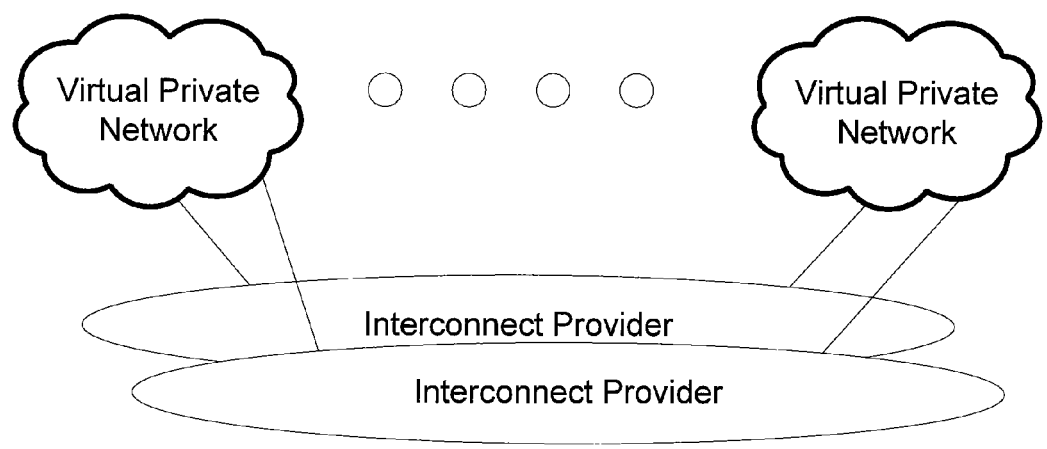
FIG. 15 is a diagram illustrating interconnection of two virtual private networks using a multiple transit certified service providers according to the present invention.

There are multiple methods of interconnecting multiple VPNs with interconnect providers. As shown in FIG. 14, all the VPNs, having multiple service providers, can be interconnected using a single interconnect provider. Alternatively, all the VPNs can be interconnected by multiple interconnect providers, as shown in FIG. 15, thereby creating competition between the interconnect providers, just as there is competition between the CSPs in a single xNX-type VPN. Finally, as shown in FIG. 16, where no suitable interconnect provider is available to connect all the VPNs having multiple service providers, multiple interconnect providers are used. These interconnect providers service different combinations of VPNs. In FIG. 16, interconnect provider 120 interconnects VPNs having multiple service providers 122, 124, and 126. Interconnect provider 130 interconnects VPNs having multiple service providers 132 and 126. As a result, a TP of VPN 132 must connect through both Interconnect provider 130 and Interconnect provider 120 to reach TPs of either VPN 122 or 124.

How the multiple VPNs interconnect will directly affect the resulting end-to-end service quality. FIGS. 17a–c illustrate potential configurations of multiple VPNs. In FIG. 17a a first TP 200 connects to a first CSP 210. The CSP 210 connects to a first exchange point 220. The TP 200, CSP 210, and the exchange point 220 are within a first VPN 240. A second TP 250 connects to a second CSP 260, which connects to a second exchange point 270. The TP 250, CSP 260 and exchange point 270 are within a second VPN 280. The two VPNs 240 and 280 are interconnected by an Interconnect provider 300, which is connected to the exchange points 220 and 270.

In FIG. 17b TP 200, CSP 210, exchange point 220 and Interconnect provider 300 are connected in the same manner shown in FIG. 17a. While the second TP 250 is connected to the CSP 260, the exchange point 270 is not provided. Instead CSP 260 is shown as connecting directly to the Interconnect provider 300. This embodiment encompasses the situation where the Interconnect provider 300 and CSP 260 are the same entity or are directly wired. FIG. 17c is similar to FIG. 17b, except that the Interconnect provider 300 also acts as a CSP 320, and a third TP 310 is connected directly to the Interconnect provider 300/CSP 320.

As stated previously, while the end-to-end service quality is based upon the TEL-2 specification, the degree to which the TEL-2 specification needs to be modified to interconnect multiple VPNs depends upon the chosen complexity of the interconnection. An xNX-type VPN uses a maximum of two CSPs between any two TPS. A larger value, either three or four, is needed for multiple VPNs. The Interconnect provider will account for one additional CSP, and for configuration set forth in FIG. 16, two Interconnect providers are employed in addition to the two CSPs yielding four CSPs.

Having described several embodiments of the system and method for interconnecting multiple virtual private networks in accordance with the present invention, it is believed that other modifications, variations and changes will be suggested to those skilled in the art in view of the description set forth above. It is therefore to be understood that all such variations, modifications and changes are believed to fall within the scope of the present invention as defined in the appended claims.

What is claimed is:

1. A system of interconnecting a plurality of virtual private networks, the system comprising:
- a plurality of virtual private networks, each of the virtual private networks having multiple service providers;
- at least one interconnect provider configured to connect the plurality of virtual private networks; and
- a global overseer configured to ensure end-to-end service quality across multiple ones of the plurality of virtual private networks,
- wherein end-to-end service quality across multiple ones of the plurality of virtual private networks includes maintaining the number of multiple service providers below a maximum acceptable number between a first subscriber of one of the plurality of virtual private networks to a second subscriber of another of the plurality of virtual private networks.

2. A system of interconnecting a plurality of virtual private networks, the system comprising:
- a plurality of virtual private networks, each of the virtual private networks having multiple service providers;
- at least one interconnect provider configured to connect the plurality of virtual private networks; and
- a global overseer configured to ensure end-to-end service quality across multiple ones of the plurality of virtual private networks,
- wherein each of the plurality of virtual private networks comprises a program overseer configured to ensure end-to-end service quality across its corresponding virtual private network,
- wherein each of the program overseers pays a fee to the global overseer for maintaining the global overseer and the at least one interconnect provider pays a fee to the global overseer for certification.

3. A method of interconnecting at least one interconnect provider between a plurality of virtual private networks to ensure end-to-end service quality across multiple ones of the plurality of virtual private networks, each of the virtual private networks having multiple subscribers, multiple service providers, and at least one exchange point interconnecting the plurality of multiple service providers, the method comprising steps of:
- providing at least one interconnect provider disposed between a first set of the multiple service providers in one of the plurality of virtual private networks and a second set of the multiple service providers in a second one of the plurality of virtual private networks; and
- providing a global overseer coupled to the at least one interconnect provider, wherein the global overseer is configured to ensure end-to-end service quality across multiple ones of the plurality of virtual private networks,
- wherein the at least one interconnect provider is also one of the multiple service providers within at least one of the plurality of virtual private networks.

4. A method of interconnecting at least one interconnect provider between a plurality of virtual private networks to ensure end-to-end service quality across multiple ones of the plurality of virtual private networks, each of the virtual private networks having multiple subscribers, multiple service providers, and at least one exchange point interconnecting the plurality of multiple service providers, the method comprising steps of:
- providing at least one interconnect provider disposed between a first set of the multiple service providers in one of the plurality of virtual private networks and a second set of the multiple service providers in a second one of the plurality of virtual private networks;
- providing a global overseer coupled to the at least one interconnect provider, wherein the global overseer is configured to ensure end-to-end service quality across multiple ones of the plurality of virtual private networks; and
- certifying the at least one interconnect provider by the global overseer.

5. A method of interconnecting at least one interconnect provider between a plurality of virtual private networks to ensure end-to-end service quality across multiple ones of the plurality of virtual private networks, each of the virtual private networks having multiple subscribers, multiple service providers, and at least one exchange point interconnecting the plurality of multiple service providers, the method comprising steps of:
- providing at least one interconnect provider disposed between a first set of the multiple service providers in one of the plurality of virtual private networks and a second set of the multiple service providers in a second one of the plurality of virtual private networks; and
- providing a global overseer coupled to the at least one interconnect provider, wherein the global overseer is configured to ensure end-to-end service quality across multiple ones of the plurality of virtual private networks,
- wherein a maximum number of the multiple service providers between two of the multiple subscribers is two and the maximum number of the multiple service providers and the at least one interconnect provider between subscribers of different ones of the plurality of virtual private networks is three.

* * * * *